Figure 1:
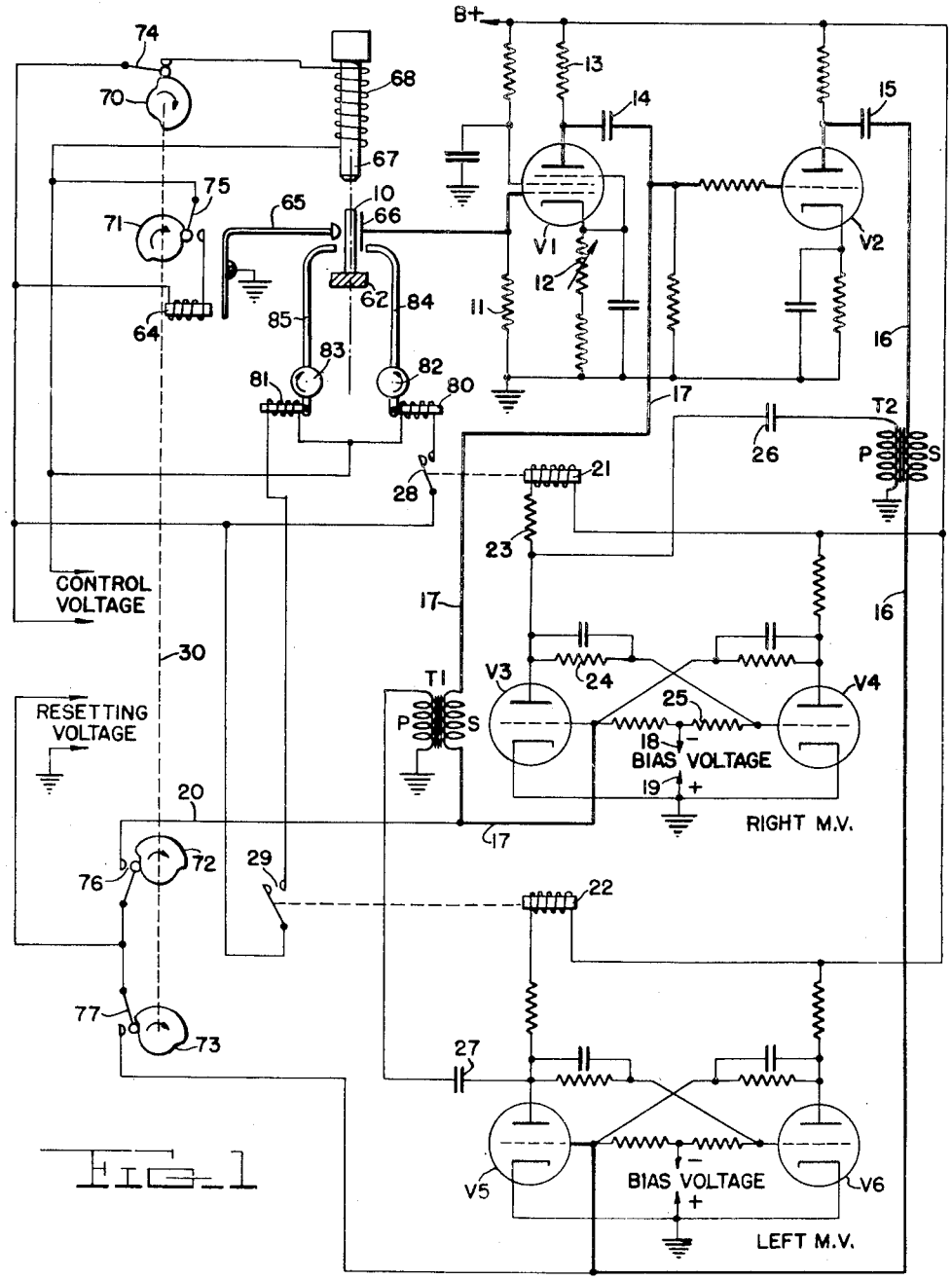

April 5, 1949.                R. A. BUSHCOTT ET AL                2,466,002
                              CRYSTAL POLARITY MARKER
Filed Feb. 7, 1946                                          4 Sheets-Sheet 1

INVENTOR.
WILLIAM J. FRY
RUDOLPH A. BUSHCOTT
BY M O Hayes
ATTORNEY

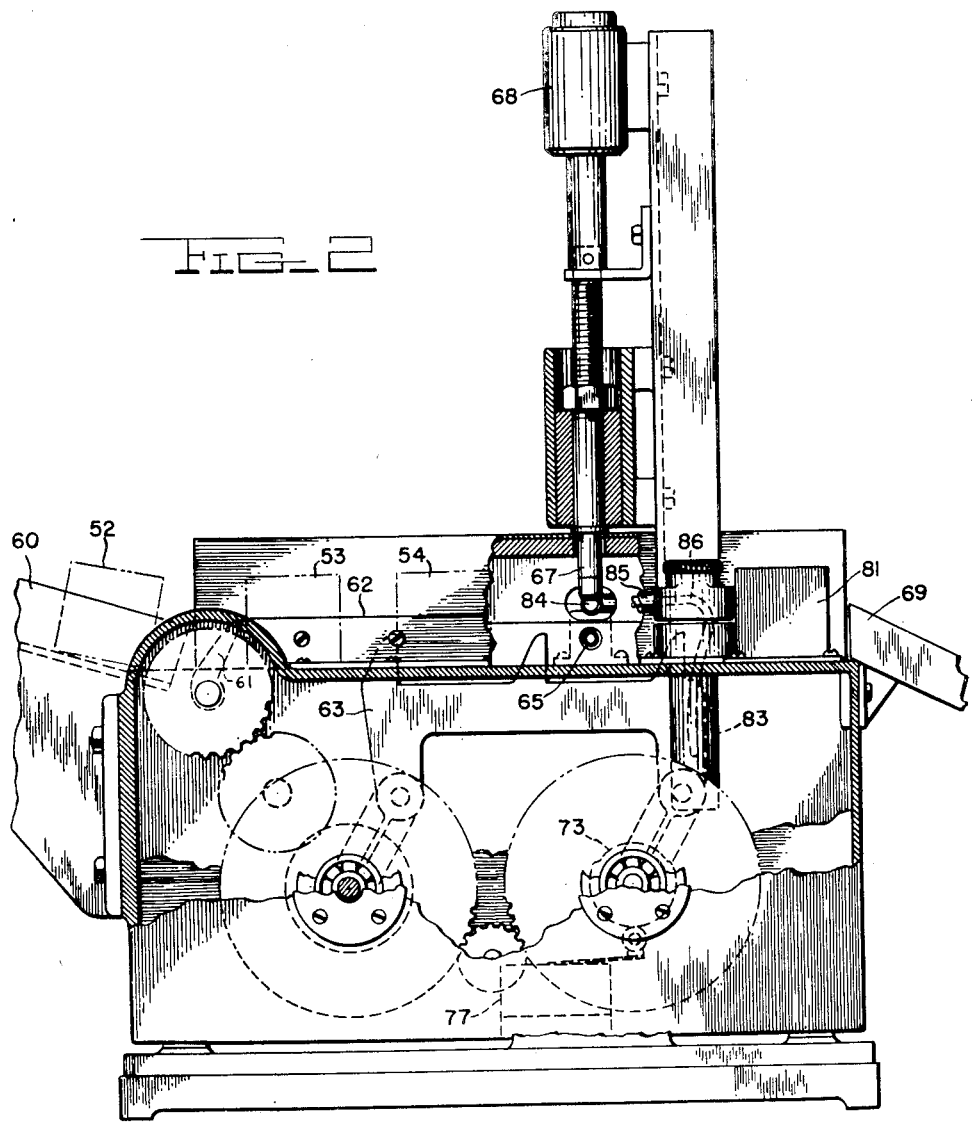

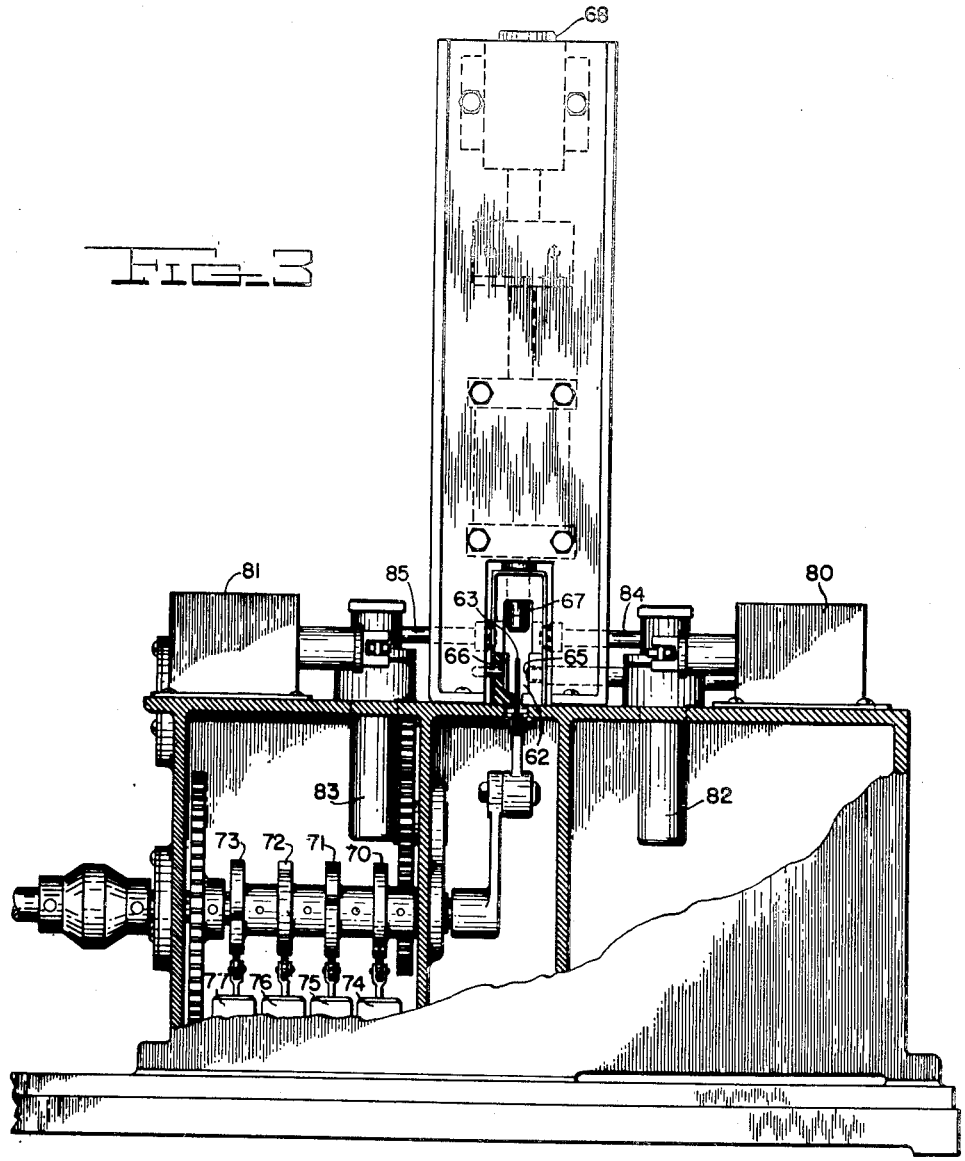

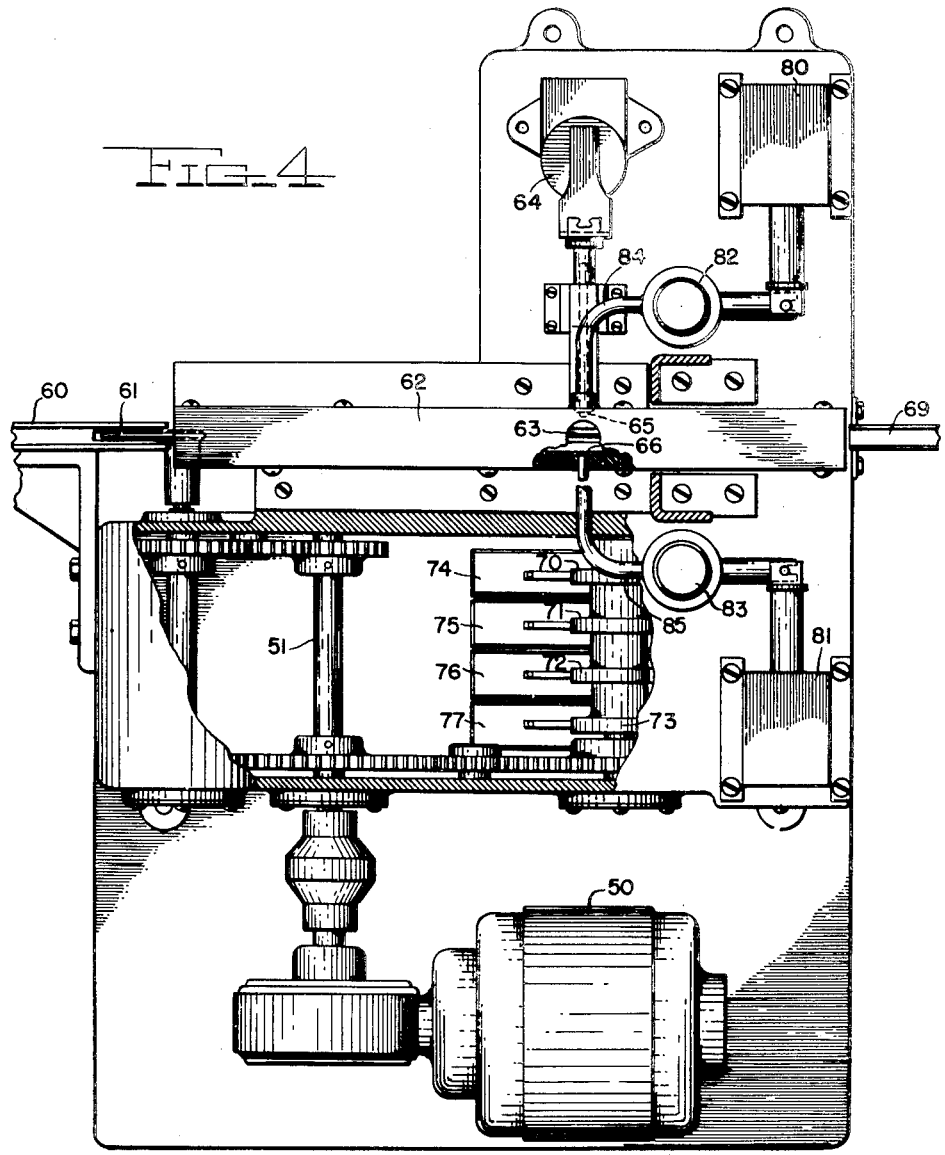

Patented Apr. 5, 1949

2,466,002

UNITED STATES PATENT OFFICE 2,466,002

CRYSTAL POLARITY MARKER

Rudolph A. Bushcott, Chicago, Ill., and
William J. Fry, Washington, D. C.

Application February 7, 1946, Serial No. 646,187

6 Claims. (Cl. 175—183)

(Granted under the act of March 3, 1883, as
amended April 30, 1928; 370 O. G. 757)

This invention relates in general to the identification and marking of the electrical polar faces of piezoelectric crystals and more particularly to a machine that will automatically identify a given polar face of a piezoelectric crystal relative to the direction and nature of the distortion and place an identifying mark thereon.

Many piezoelectric crystals, for practical utilization of their piezoelectric qualities, are cut in known manner in the form of rectangular parallelepipeds or rectangular slabs to prevent a pair of opposite electrical polar faces normal to an electrical axis and a pair of opposed faces normal to a compressional axis which latter faces may be termed movable or pressure faces. Such cut crystals when subject to pressure or tension along the compressional axis by an application of pressure or tension between a pair of opposite pressure faces, develop opposite electrical potentials or charges at the electrical faces. The primary utilization of this effect has been in the application of alternating voltages to the electrical polar faces of such a crystal to produce corresponding physical vibration along definite directions of the crystal, and the generation of an alternating voltage across the polar faces as a result of a corresponding vibrating tension or pressure applied to given surfaces of the crystal. Piezoelectric crystals find a wide application in modern technology. Especially true of this, is the expanding field of ultrasonics, wherein it is common to group a plurality of crystals in parallel combinations to afford greater ultrasonic energy generation, or conversely, to provide greater sensitivity in the detection or reception of ultrasonic disturbances. For parallel grouping, it is necessary to know the polarity of the voltage developed across a given pair of electrical polar faces when a pressure, tension, or distortion of a given nature is applied in a definite manner. The methods used for the sorting and marking of crystal polar faces prior to this invention were both tedious and subject to human error.

An object of this invention is to create a device which will make possible accurate and high speed mass-production marking of a given polarity face of piezoelectric crystals, relative to the direction and nature of the distortion.

Another object of the invention is polarity identification of piezoelectric crystal faces, when distorted along given directions, by completely automatic means.

A further object of the invention is to provide means for placing an identifying mark on a given polarity face of a piezoelectric crystal distorted in a given manner, by completely automatic means.

A still further object of the invention is to provide means for preventing all but the first electric pulse across the crystal, arising from the initial distorting force, form effecting the polarity selection of the crystal polarity marker circuit.

A still further object of the invention is to provide a machine which will automatically feed in a plurality of piezoelectric crystals and, upon receiving a distorting force of a predetermined nature, identify a given polar face relative to the direction and nature of the distortion, placing thereon an identifying mark, and automatically eject the marked crystal from the machine.

Other and further objects and features of this invention will be apparent from the following specification and drawings, showing only an exemplary embodiment of the invention, in which:

Figure 1 is a diagram of the electronic circuit of the invention showing schematically its relation to the primary functional parts of the machine; and Figure 2 is a side view, partly in section and partly broken away, of the automatic crystal polarity marker machine associated with the circuit diagram of Figure 1; and Figure 3 is an end view, partly broken away, of the machine; and Figure 4 is a plan view, partly broken away and partly in section, of this machine.

Figure 1 is a schematic diagram of the electronic circuit used with the crystal polarity marker, showing diagrammatically, the basic mechanical action. The circuit is composed of an amplifier of variable sensitivity, a phase inverter stage, two identical flip-flop or one-shot multivibrators, two iron core transformers which are used to couple a disabling signal from the operative multivibrator to the inoperative multivibrator, and switching means to reset the one-shot multivibrators. Since the eventual purpose of the device is to place an identifying mark on one or the other electrical polar faces of the crystal, all elements of the invention directed toward marking the left side of the crystal 10, as shown in the diagram Fig. 1, will be prefixed with the word "left," and similarly the word "right" for the right-hand elements. For the embodiment herein described, the identifying mark will always be placed on the negative face of the crystal. The electrical impulse from the crystal is developed across the input resistor 11 from contact plate 66 and contact arm 65 and is supplied to the control grid of amplifier tube V1. This voltage, positive or negative, will be amplified and inverted by tube V1 and will appear across the load resistor 13, where it is coupled through condenser 14 on the one hand to the inverter tube V2 and on the other hand through the secondary of transformer T1 to the grid of tube V3 of the right multivibrator. The amplification of inverter tube V2 is approximately unity so that the signal coupled from its plate through condenser 15 to lead 16 is of the same amplitude as the signal coupled from the plate of tube V1 through condenser 14 on to lead 17 but, is 180° out of phase. The right one-shot multivibrator consisting of tubes V3 and V4 is identical to the left one-shot multivibrator consisting of tubes V5 and V6. Both are connected to the same source of plate and bias voltage, and the description of operation given to one, applies equally to the other. A source of bias voltage of about 85 volts, connected with polarities as shown at terminals 18 and 19 assures that one side of the multivibrator will be cut off. Lead 20, momentarily connects the grid of V3 through microswitch 76 to a resetting voltage of about minus 30 volts and assures that tube V3 will be the normally cut-off tube, while tube V4 will be normally conducting. When a positive pulse from lead 17 is placed on the grid of tube V3, said tube will conduct causing plate current to flow and relay 21 to be energized. The circuit will stay in this state of operation until microswitch 76 is closed allowing the resetting voltage to be placed on the grid of tube V3, cutting said tube off. If applying a pressure to crystal 10 produces a negative charge on contact plate 66 and consequently causes a positive pulse to appear on lead 17 then releasing the pressure on the crystal will produce a positive charge on 66 and cause a negative pulse to appear on lead 17, and a positive pulse on lead 16, since the last mentioned lead always bears a signal of opposite polarity to the signal on lead 17. To insure that the positive signal on lead 16 does not flip the left one-shot multivibrator and energize relay 22, a negative gating pulse is introduced on lead 16 through transformer T2. This is done as follows: Load resistor 23, resistor 24, and resistor 25, together with the direct current resistance of relay 21, form a voltage dividing network from B+ to ground. The value of resistor 25 is such that the grid of tube V4 is made to assume the cathode potential when tube V4 is conducting. This voltage dividing action places about 270 volts on the plate of the non-conducting tube V3, and causes condenser 26, connected from this plate through the primary of transformer T2 to ground, to assume a corresponding 270 volts charge. When a positive signal is applied to the grid of V3, the result of a negative charge at 66, flipping the circuit over and making tube V3 conduct, current flows through relay 21 and plate resistor 23, resulting in about a 200 volt drop in plate potential. Condenser 26 must then discharge from 270 volts to about 70 volts through the primary of transformer T2, the plate resistor 23, and relay 21. This discharge current flowing through the primary of transformer T2 induces a voltage in the nature of a negative gating pulse on lead 16. This gating pulse is then impressed on the grid of tube V5 of the left multivibrator and serves to bias any undesirable signals to a value below the cut-off level of tube V5. In like manner, condenser 27, discharging through the primary of transformer T1, effectively disables the right multivibrator when the left multivibrator is operative. Thus is provided means whereby all but the first electric pulse arising from each hammer blow on the crystal is prevented from actuating one of the markers.

Four cams, 70, 71, 72, and 73, keyed together on the same shaft 30 and actuating microswitches 74, 75, 76 and 77 respectively, control the action of the crystal polarity marker circuit. An exemplary cycle of operation is as follows: Reset cams 72 and 73 close microswitches 76 and 77 respectively and effect the application of the resetting voltage to the grids of tubes V3 and V5 making said tubes non-conductive. The crystal 10 is moved into position under the hammer 67 on chute 62 by a mechanism which will be described later. Reset switches 76 and 77 are opened by cams 72 and 73 respectively in preparation for a polarity determining signal. Contact arm cam 71 closes contact arm microswitch 75 energizing contact arm relay 64 causing contact arm 65 to move to the right making contact with crystal 10 on one side and causing contact plate 66 to make contact on the other side. Next, hammer cam 70 opens microswitch 74 and de-energizes solenoid 68 causing hammer 67 to drop and strike a blow on crystal 10. This deformation will result in an excitation of the crystal such that the crystal will give either a positive or negative pulse of voltage on contact plate 66 depending upon the orientation of crystal 10. If it is a positive pulse it will result in a negative pulse at the plate of tube V1 which negative pulse will be inverted to a positive pulse at the plate of V2. This will result in the flipping operation of the left multivibrator and energize relay 22, closing switch 29, which in turn will energize the left marker solenoid 81. Left inkwell 83 rotates about its center and carries with it inking arm 85 to place a mark on the then negatively charged face of the crystal 10, said rotary action being instigated by the energization of solenoid 81. Thus, a positive pulse on contact plate 66 produces a mark on the left hand face of the crystal then at negative polarity. It is necessary that this mark be made somewhat removed from the center of the crystal face in such a way, preferably below center as shown, as to uniquely determine the orientation of the crystal relative to the direction and nature of the distortion. In like manner a negative pulse on the contact plate 66 results in a positive pulse at the plate of tube V1. This positive pulse starts the flipping action of the right multivibrator turning on tube V3 and energizing relay 21. Switch 28 is closed and right marker solenoid 80 is energized, causing the right crystal face to be marked. Thus, it is seen in the embodiment herein described that the crystal is always marked on that electrical polar face which becomes negatively charged coincidentally with the hammer blow on the top of the crystal, the mark being made below center to indicate the direction of the compressional force which produced the negative charge on the marked side of the crystal. Solenoid 68, 81, 80 and relay 64 all receive their energizing voltage from an appropriate control voltage source, as shown in Figure 1.

An exemplary model of an automatic machine that is used in conjunction with the aforementioned circuit, is shown in side view, end view and plan view in Figures 2, 3, and 4 respectively. As seen from Figure 4, motor 50 drives main shaft 51 which in turn drives through appropriate gears, cams 70, 71, 72 and 73, and the crystal moving means consisting of feeder arm 61 and shuttle 63 shown more clearly in Figure 2. Referring now to Figure 2, crystal 52 is shown on feeder chute 60 shaped to guide therethrough the rectangular crystal slabs with one of the narrow or pressure faces upward, and the two large or electrical polar faces at the sides shown. Feeder arm 61 is in the process of moving crystal 53 into position on the shuttle chute 62 for the next shuttle cycle. Shuttle 63 is in the process of moving crystal 54 along chute 62 to the marking position under hammer 67, the shuttle chute also being shaped to guide the crystal therethrough with the same pressure face upward and the same polar faces at the sides, so that the crystal will have this orientation in the marking position 55. The cut away view of the chute and its protective cover show the hammer 67 in the deenergized position, contact arm 65, and the tip of right inking arm 84. Right inking arm 84 is more clearly shown in Figure 4. Here, inkwells 82 and 83, together with marker solenoids 80 and 81, are also shown. Contact arm relay 64 is clearly seen, and a cut-away view of chute 62 reveals contact plate 66. Referring again to Figure 2, wick 86 can be seen in left inkwell 83. Eject chute 69 where the crystals are ejected is shown to the right, and hammer solenoid 68 is shown at the top. A summary of the marking and cam action may be had by studying the end view in Figure 3. Here, a cross sectional view of the chute 62 is taken at the contact plate 66.

While one particular embodiment has been herein disclosed, it is to be clearly understood that various embodiments could be devised and still not depart from the spirit or scope of this invention.

The invention described herein may be manufactured and used by or for the Government of the United States of America for government purposes without the payment of any royalty thereon or therefor.

What is claimed is:

1. A device for automatically determining and marking the polarity of cut piezoelectric crystal slabs comprising a shuttle chute shaped to guide a rectangular crystal slab therethrough with one of the pressure faces upward and a pair of opposite polar faces at the sides, a feeder chute shaped to guide the crystal to the shuttle chute with the said one of the pressure faces upward and the said pair of opposite polar faces at the sides, said shuttle chute having an entrance end, a delivery end and a marking station therein intermediate the ends, a feeder arm for moving a crystal from the feeder chute into the entrance end of the shuttle chute, a shuttle element for moving a crystal through the shuttle chute from the entrance end to the delivery end, means for applying a distorting force to a crystal at the said one upper face in the marking station, a pair of electrical contact elements positioned to make contact with said opposite polar faces respectively of a crystal in the marking station, electrically actuated marking means positioned each to mark one of the said polar faces of a crystal in the marking station and electrical control means for said marking means connected with said contact means and differentially responsive to electrical pulses applied from a crystal to the contact elements to actuate one or the other said marking means according to the polarity distribution of the charge.

2. A device for automatically determining and marking the polarity of cut piezoelectric crystal slabs comprising a shuttle chute shaped to guide a rectangular crystal slab therethrough with one of the pressure faces upward and a pair of opposite polar faces at the sides, a feeder chute shaped to guide the crystal to the shuttle chute with the said one of the pressure faces upward and the said pair of opposite polar faces at the sides, said shuttle chute having an entrance end, a delivery end and a marking station therein intermediate the ends, a feeder arm for moving a crystal from the feeder chute into the entrance end of the shuttle chute, a shuttle element for moving a crystal through the shuttle chute from the entrance end to the delivery end, means for applying a distorting force to a crystal at the said one upper face in the marking station, a pair of electrical contact elements positioned to make contact with said opposite polar faces respectively of a crystal in the marking station, electrically actuated marking means positioned each to mark one of the said polar faces of a crystal in the marking station and electrical control means for said marking means connected with said contact means and differentially responsive to electrical pulses applied from a crystal to the contact elements to actuate one or the other said marking means according to the polarity distribution of the charge, said marking means being positioned to mark each crystal substantially on the vertical center of the face marked and substantially spaced from the horizontal center so as to record the orientation of the crystal at the time of marking.

3. A device for automatically determining and marking the polarity of cut piezoelectric crystal slabs comprising a shuttle chute shaped to guide a rectangular crystal slab therethrough with one of the pressure faces upward and a pair of opposite polar faces at the sides, a feeder chute shaped to guide the crystal to the shuttle chute with the said one of the pressure faces upward and the said pair of opposite polar faces at the sides, said shuttle chute having an entrance end, a delivery end and a marking station therein intermediate the ends, a feeder arm for moving a crystal from the feeder chute into the entrance end of the shuttle chute, a shuttle element for moving a crystal through the shuttle chute from the entrance end to the delivery end, means for applying a distorting force to a crystal at the said one upper face in the marking station, a pair of electrical contact elements positioned to make contact with said opposite polar faces respectively of a crystal in the marking station, electrically actuated marking means positioned each to mark one of the said polar faces of a crystal in the marking station and electrical control means for said marking means connected with said contact means and differentially responsive to electrical pulses applied from a crystal to the contact elements to actuate one or the other said marking means according to the polarity distribution of the charge, together with means for controlling the actuation of said contact elements and distortion-force means in sequence.

4. A device for automatically determining and marking the polarity of cut piezoelectric crystal slabs comprising a shuttle chute shaped to guide a rectangular crystal slab therethrough with one of the pressure faces upward and a pair of opposite polar faces at the sides, a feeder chute shaped to guide the crystal to the shuttle chute with the said one of the pressure faces upward and the said pair of opposite polar faces at the sides, said shuttle chute having an entrance end, a delivery end and a marking station therein intermediate the ends, a feeder arm for moving a crystal from the feeder chute into the entrance end of the shuttle chute, a shuttle element for moving a crystal through the shuttle chute from the entrance end to the delivery end, means for applying a distorting force to a crystal at the said one upper face in the marking station, a pair of electrical contact elements positioned to make contact with said opposite polar faces respectively of a crystal in the marking station, electrically actuated marking means positioned each to mark one of the said polar faces of a crystal in the marking station and electrical control means for said marking means connected with said contact means and differentially responsive to electrical pulses applied from a crystal to the contact elements to actuate one or the other said marking means according to the polarity distribution of the charge, said means for applying a distorting force comprising a drop hammer.

5. A device for automatically determining and marking the polarity of cut piezoelectric crystals comprising in combination means for moving a cut piezoelectric crystal into a marking position, a pair of electrically actuated marking means positioned each to mark one of two opposite faces of the crystal in the marking position, means for applying a distorting force to the crystal at the top of the crystal in the marking position, a pair of electrical contact elements positioned to make contact with said opposite faces respectively, electrical control means operatively connected to said contact elements and said marking means and differentially responsive to an electrical pulse applied from the crystal to said contact elements to actuate one or the other of said marking means according to the polarity distribution of the charges at the contact elements, and means preventing all but the first pulse from actuating the marking means.

6. A crystal testing and marking device comprising a pair of contact elements positioned to be brought into contact with a pair of opposite electrical polar faces of a cut piezoelectric crystal, a pair of electrically actuated marking means each positioned to mark one of said polar faces, means for applying a mechanical distorting force along a compressional axis of the crystal whereby opposite electrical charges are produced on said opposite polar faces respectively, and electrical means connected with said contact elements differentially responsive to the said charges to energize one of two control circuits according to the polarity distribution of the charges with respect to the contact elements, each said marking means being actuated upon energizaton of one of said control circuits respectively.

RUDOLPH A. BUSHCOTT.
WILLIAM J. FRY.

REFERENCES CITED

The following references are of record in the file of this patent:

UNITED STATES PATENTS

| Number | Name | Date |
| --- | --- | --- |
| 733,627 | Cox | July 14, 1903 |
| 1,817,181 | Eberhard | Aug. 4, 1931 |
| 1,866,454 | Dawson | July 5, 1932 |
| 1,940,521 | Acosta | Dec. 19, 1933 |
| 2,173,552 | Frankline | Sept. 19, 1939 |
| 2,232,284 | Tisza | Feb. 18, 1941 |
| 2,423,970 | Gardner | July 15, 1947 |

OTHER REFERENCES

Journal of Optical Society of America and Review of Scientific Instruments, vol VI, March 1922, pp. 183–185.